US006992459B2

(12) United States Patent
 Kikuchi

(10) Patent No.: US 6,992,459 B2
(45) Date of Patent: Jan. 31, 2006

(54) STEPPING MOTOR CONTROLLING APPARATUS AND METHOD, AND IMAGE READING APPARATUS AND METHOD

(75) Inventor: Akitoshi Kikuchi, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 437 days.

(21) Appl. No.: 09/988,439

(22) Filed: Nov. 20, 2001

(65) Prior Publication Data

US 2002/0067150 A1 Jun. 6, 2002

(30) Foreign Application Priority Data

Nov. 21, 2000 (JP) ....................................... 2000-354901
Nov. 13, 2001 (JP) ....................................... 2001-347896

(51) Int. Cl.
 *H02P 8/00* (2006.01)

(52) U.S. Cl. ....................................... 318/696; 318/685
(58) Field of Classification Search ................. 318/138, 318/696, 685, 254
 See application file for complete search history.

(56) References Cited

U.S. PATENT DOCUMENTS

| | | | | | |
|---|---|---|---|---|---|
| 3,657,707 A | * | 4/1972 | McFarland et al. | ......... | 365/127 |
| 4,962,393 A | * | 10/1990 | Fulton et al. | ................ | 347/111 |
| 5,109,476 A | * | 4/1992 | Thompson | ................... | 358/1.5 |
| 5,177,507 A | * | 1/1993 | Ng | .............................. | 347/118 |
| 5,992,318 A | * | 11/1999 | DiBello et al. | ............. | 101/181 |
| 6,009,215 A | * | 12/1999 | Yamada | ...................... | 382/321 |
| 6,384,928 B2 | * | 5/2002 | Nagasawa et al. | ......... | 358/1.15 |
| 6,388,415 B1 | * | 5/2002 | Huang | ........................ | 318/685 |

FOREIGN PATENT DOCUMENTS

| JP | 05-122470 | 5/1993 |
|---|---|---|
| JP | 06-153593 | 5/1994 |

* cited by examiner

*Primary Examiner*—David Martin
*Assistant Examiner*—Renata McCloud
(74) *Attorney, Agent, or Firm*—Fitzpatrick, Cella, Harper & Scinto

(57) ABSTRACT

Stepping drive control of a motor is effected by synchronizing interruption to a CPU with N (in number) line triggers set to N times of one-line of an image. Further, in a synchronous mode in which phase control is effected in synchronous with N line triggers, acceleration/deceleration table can be switched not only by the N line triggers (external triggers) but also by internal triggers. With this arrangement, acceleration and deceleration of the motor is permitted within the N line triggers (external triggers) while being synchronized with the N line triggers (external triggers), thereby reducing a burden of software processing and realizing motor control corresponding to interruption of one line during high speed reading.

8 Claims, 9 Drawing Sheets

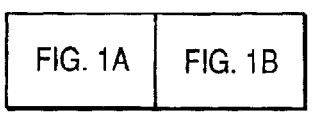
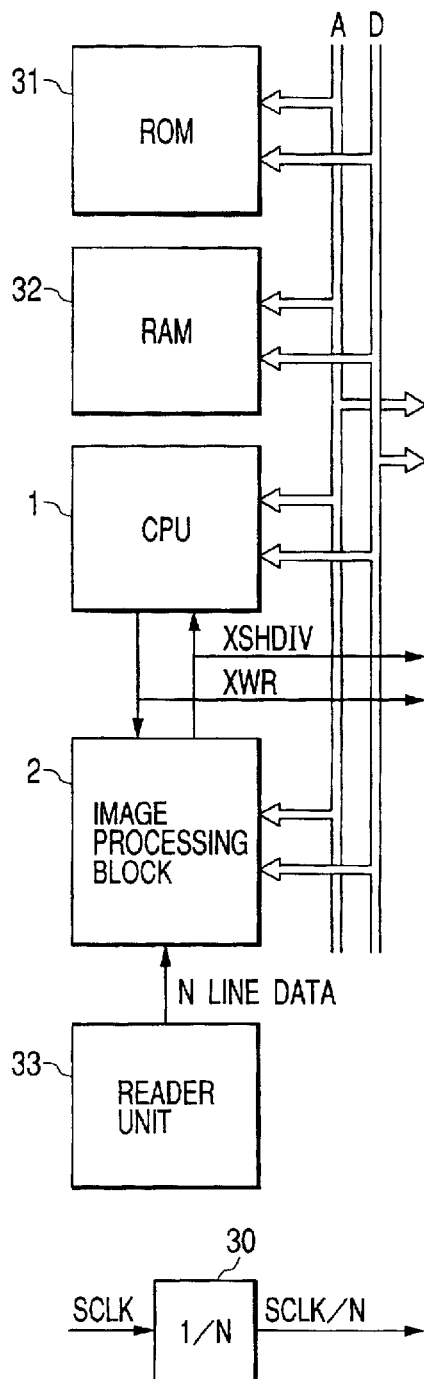
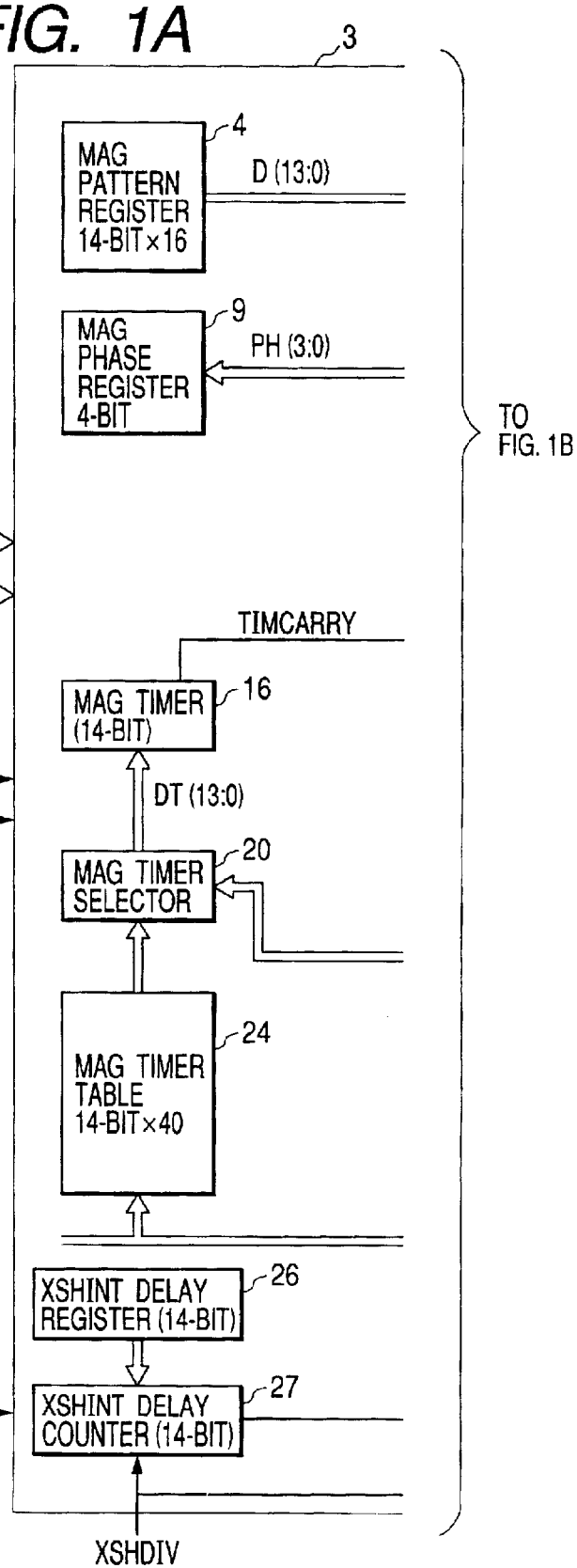

STEPPING MOTOR CONTROLLING APPARATUS AND METHOD, AND IMAGE READING APPARATUS AND METHOD

BACKGROUND OF THE INVENTION

1. Field of the Invention

The present invention relates to apparatus and method for controlling a stepping motor, and an image reading apparatus, and more particularly, it relates to a technique regarding speed-up and speed-down (hereinafter "acceleration/deceleration") and fixed speed control of a stepping motor used in an original conveyance controlling apparatus of a facsimile, an original reading sensor shift controlling apparatus of a copying machine or a sheet feed controlling apparatus of a printer.

2. Related Background Art

As a motor for controlling conveyance of an original in a facsimile or a motor of a reading portion in original reading sensor shift control in a copying machine, a stepping motor has conventionally been used. In control of the stepping motor, interruption output or trigger output to a CPU and a stepping motor control unit was synchronized with the interruption on the basis of one-line of an image, i.e., one step of the stepping motor, thereby effecting drive control of the motor.

Further, when an exciting current for the stepping motor was determined by using PWM output, since the number of bits of the PWM output was fixed in dependence upon hardware, the motor driving suitable for an image to be read could not be attained. Further, in acceleration/deceleration data tables for effecting phase control of the stepping motor, the number of the tables and the number of steps were fixed.

As mentioned above, in the original conveyance control in the facsimile or the motor control of the reading portion in the original reading sensor shift control in the copying machine, the drive control was effected by synchronizing the interruption output or trigger output to the CPU and the stepping motor control unit with the interruption on the basis of one-line of the image, i.e., one step of the stepping motor. However, in such drive control, there arose a problem that a burden of software processing was increased. For example, as a reading speed for the original was increased, an interval for interruption processing to the CPU was shortened, and a ratio of interruption routine of software was increased or other software processing time was increased.

Further, since the number of bits of the PWM output for determining the exciting current of the motor was fixed, the number of bits of the PWM output could not be changed. Thus, when a color image or an image having high resolving power was read at high speed in a highly fine manner (instructed from an operating portion (not shown)), there arose a problem that a smooth current wave form could not be formed and smooth motor driving could not be attained. Further, in the acceleration/deceleration data tables for effecting the phase control of the motor, since the number of the data tables was fixed, even if the number of data tables was not required, program data corresponding to the number of data tables was required. Further, since the number of steps of the data table was fixed and a condition of a data table number could not read, if acceleration/deceleration control exceeding the number of acceleration/deceleration data tables was effected, renewal portions of a data table register and a present data table number had to be grasped by software, which made software processing more complicated.

SUMMARY OF THE INVENTION

The present invention is made in consideration of the above-mentioned conventional problems, and an object of the present invention is to reduce a burden of software processing of a CPU and to achieve motor control corresponding to one-line interruption during high speed reading.

A second object of the present invention is to achieve high speed and highly fine reading having low burden of a CPU even when a memory having small memory capacity is used.

A third object of the present invention is to obtain an optimum exciting current suitable for an image by changing the number of bits of PWM output and to permit stable motor control even when a highly fine image is read at a high speed.

A fourth object of the present invention is to permit selection of optimum motor control by preparing a plurality of motor control modes.

A fifth object of the present invention is to permit of selection of optimum motor control in accordance with attribution of an image.

A sixth object of the present invention is to provide apparatus and method for controlling a stepping motor, in which a burden of software processing of a CPU is reduced and a stable operation is realized regarding reading stoppage due to poor memory, position adjustment and acceleration/deceleration control in reading re-start, while driving a stepping motor at a high speed even with respect to a color image having much image data amount and an image having fine resolving power.

To achieve the above objects, the present invention provides apparatus and method for controlling a stepping motor, comprising synchronous signal generating means for generating a synchronous signal having a period corresponding to N (natural number) times of one-line of an image, line trigger producing means for producing N (in number) line triggers in synchronous with generation of the synchronous signal, a motor control unit for controlling the stepping motor, and a CPU for controlling the motor control unit in synchronous with the generation of the synchronous signal, wherein the motor control unit effects motor control until at least next synchronous signal is reached on the basis of the line triggers.

Further, the present invention provides the apparatus and method for controlling a stepping motor, in which the motor control unit includes first memory means for holding timer data for advancing a phase of the stepping motor and second memory means for holding the number of steps of the timer data, and the stepping motor is controlled on the basis of the timer data and the number of steps.

Further, the present invention provides the apparatus and method for controlling a stepping motor, in which the motor control unit is synchronized with the line triggers produced by the producing means and controls acceleration/deceleration of the stepping motor by switching acceleration/deceleration data tables comprised of the timer data and the number of steps.

Further, the present invention provides apparatus and method for controlling a stepping motor, comprising synchronous signal generating means for generating a synchronous signal for synchronizing with a motor control unit, a motor control unit for controlling the stepping motor, and a CPU for controlling the motor control unit, and line trigger producing means for producing N (in number) line triggers, wherein the motor control unit has a synchronous mode for controlling the stepping motor in synchronous with generation of the synchronous signal and a non-synchronous mode for controlling the stepping motor regardless of the generation of the synchronous signal. When the synchronous mode is selected, the motor control synchronous with the synchronous signal is effected, and, when the non-synchronous mode is set, the line trigger producing means generates line triggers which are not synchronous with the synchronous signal and the motor control unit controls the motor on the basis of the line triggers which are not synchronous with the synchronous signal.

Further, the present invention provides the apparatus and method for controlling a stepping motor, in which the synchronous signal generating means generates the synchronous signal having a period corresponding to N (natural number) times of one-line of an image, and, when the synchronous mode is selected, the line trigger producing means produces the line trigger synchronous with the synchronous signal, and the motor control unit effects motor control until at least next synchronous signal is reached on the basis of the line trigger synchronous with the interruption (synchronous) signal.

Further, the present invention provides the apparatus and method for controlling a stepping motor, in which the motor control unit includes first memory means for holding timer data for advancing a phase of the stepping motor and second memory means for holding the number of steps of the timer data, and the stepping motor is controlled on the basis of the timer data and the number of steps.

Further, the present invention provides the apparatus and method for controlling a stepping motor, in which the motor control unit is synchronized with the line triggers produced by the producing means and controls acceleration/ deceleration of the stepping motor by switching acceleration/deceleration data tables comprised of the timer data and the number of steps.

Further, the present invention provides the apparatus and method for controlling a stepping motor, in which the synchronous mode is selected in case of an image having great memory usage amount and the non-synchronous mode is selected in case of an image having small memory usage amount.

Further, the present invention provides the apparatus and method for controlling a stepping motor, in which the synchronous mode is selected in case of a color image and the non-synchronous mode is selected in case of a monochromatic image.

Further, the present invention provides apparatus and method for reading an image, comprising reading means for reading an image with line unit, storing means for storing the read image, synchronous signal generating means for generating a synchronous signal having a period corresponding to N (natural number) times of one-line of the image, line trigger producing means for producing N (in number) line triggers in synchronous with generation of the synchronous signal, a motor control unit for effecting acceleration/ deceleration control of the stepping motor on the basis of the line triggers, a CPU for controlling the motor control unit in synchronous with the generation of the synchronous signal, judging means for judging a usage state of the storing means, and stop control means for causing the CPU to effect control for stopping the motor with respect to the motor control unit in synchronous with the generation of the synchronous signal when the judge means judges that vacant capacity of the storing means is smaller than a predetermined value (or that usage amount of the storing means is smaller than a predetermined value), wherein the motor control unit effects stop control for decelerating and stopping the motor on the basis of the line triggers by means of the stop control means.

Further, the present invention provides the apparatus and method for reading an image, in which the judging means includes reading re-start instructing means for instructing re-start of reading when it is judged that the vacant capacity of the storing means is greater than the predetermined value.

Further, the present invention provides the apparatus and method for reading an image, in which, when the reading re-start instructing means instructs the re-start of reading in synchronous with the generation of the synchronous signal, the motor control unit accelerates the motor to reversely rotate the motor up to a position sufficient to effect fixed speed driving to a deceleration starting position from which deceleration is started by the stop instruction, thereby permitting the re-start of reading at a high speed again.

Further, the present invention provides the apparatus and method for reading an image, wherein the motor control unit has a synchronous mode for controlling the stepping motor in synchronous with the generation of the synchronous signal and a non-synchronous mode for controlling the stepping motor regardless of the generation of the synchronous signal, and when the non-synchronous mode is selected, the line trigger producing means generates the N (in number) line triggers regardless of the generation of the synchronous signal and the motor control unit controls the motor on the basis of the N line triggers which are not synchronous with the synchronous signal.

Further, the present invention provides the apparatus and method for reading an image, in which the synchronous mode is selected in case of an image having great memory usage amount and the non-synchronous mode is selected in case of an image having small memory usage amount.

Further, the present invention provides the apparatus and method for reading an image, in which the synchronous mode is selected in case of a color image and the non-synchronous mode is selected in case of a monochromatic image.

Further, the present invention provides apparatus and method for controlling a stepping motor, comprising synchronous signal generating means for generating a synchronous signal having a period corresponding to N (natural number) times of one-line of an image, line trigger producing means for producing N (in number) line triggers in synchronous with generation of the synchronous signal, a motor control unit for controlling the stepping motor, and instruction receiving means for receiving a motor control instruction from a CPU in synchronous with the generation of the synchronous signal, wherein the motor control unit effects motor control until at least next synchronous signal is reached on the basis of the line triggers.

Further, the present invention provides the apparatus and method for controlling a stepping motor, in which the motor control unit includes first memory means for holding timer data for advancing a phase of the stepping motor and second memory means for holding the number of steps of the timer data, and the stepping motor is controlled on the basis of the timer data and the number of steps.

Further, the present invention provides the apparatus and method for controlling a stepping motor, in which the motor control unit is synchronized with the line triggers produced by the producing means and controls acceleration/ deceleration of the stepping motor by switching acceleration/deceleration data tables comprised of the timer data and the number of steps.

Further, the present invention provides apparatus and method for controlling a stepping motor, comprising synchronous signal receiving means for receiving a synchronous signal for synchronizing with a motor control unit, a motor control unit for controlling the stepping motor, instruction receiving means for receiving motor control instruction from a CPU, and line trigger producing means for producing line triggers at a period corresponding to one line of an image, wherein the motor control unit has a synchronous mode for controlling the stepping motor in synchronous with receipt of the synchronous signal and a non-synchronous mode for controlling the stepping motor regardless of receipt of the interruption (synchronous) signal. When the synchronous mode is selected, the instruction receiving means receives the motor control instruction from the CPU in synchronous with generation of the synchronous signal and the motor control unit effects motor control on the basis of the instruction received by the instruction receiving means, and when the non-synchronous mode is set, the line trigger producing means produces the line triggers which are not synchronous with the synchronous signal and the motor control unit effects the motor control on the basis of the line triggers which are not synchronous with the synchronous signal.

Further, the present invention provides the apparatus and method for controlling a stepping motor, wherein the synchronous signal receiving means receives the synchronous signal having a period corresponding to N (natural number) times of one-line of the image, and wherein, when the synchronous mode is selected, the line trigger producing means produces a line trigger which is synchronous with the synchronous signal and the motor control unit effects the motor control until at least next synchronous signal is reached on the basis of the line trigger which is synchronous with the synchronous (interruption) signal.

Further, the present invention provides the apparatus and method for controlling a stepping motor, in which the motor control unit includes first memory means for holding timer data for advancing a phase of the stepping motor and second memory means for holding the number of steps of the timer data, and the stepping motor is controlled on the basis of the timer data and the number of steps.

Further, the present invention provides the apparatus and method for controlling a stepping motor, in which the motor control unit is synchronized with the line triggers produced by the producing means and controls acceleration/deceleration of the stepping motor by switching acceleration/deceleration data tables comprised of the timer data and the number of steps.

Further, the present invention provides the apparatus and method for controlling a stepping motor, in which the synchronous mode is selected in case of an image having great memory usage amount and the non-synchronous mode is selected in case of an image having small memory usage amount.

Further, the present invention provides the apparatus and method for controlling a stepping motor, in which the synchronous mode is selected in case of a color image and the non-synchronous mode is selected in case of a monochromatic image.

Further, the present invention provides the apparatus and method for controlling a stepping motor, in which the motor control unit includes PWM output data storing means for holding PWM output data having a predetermined the number of bits for determining an exciting current for the stepping motor, and PWM output means for outputting the PWM data stored in the PWM output data storing means in synchronous with a phase of the stepping motor, and wherein the stepping motor is controlled by setting the number of bits of the PWM data outputted from the PWM output means.

Further, the present invention provides the apparatus and method for reading an image, wherein the motor control unit includes PWM output data storing means for holding PWM output data having a predetermined the number of bits for determining exciting current for the stepping motor, and PWM output means for outputting the PWM data stored in the PWM output data storing means in synchronous with a phase of the stepping motor, and wherein the stepping motor is controlled by setting the number of bits of the PWM data outputted from the PWM output means.

Further, the present invention provides the apparatus and method for controlling a stepping motor, in which the motor control unit includes step-up or step-down number storing means for holding a step-up number or a step-down number of the acceleration/deceleration table, and step-up or step-down of the acceleration/deceleration table is effected on the basis of the step-up number or the step-down number held by the step-up or step-down number storing means.

Further, the present invention provides the apparatus and method for controlling a stepping motor, in which the motor control unit includes table number storing means for holding a table number of the acceleration/deceleration tables, step-up or step-down of the acceleration/deceleration table is stopped on the basis of the table number held by the table number storing means.

BRIEF DESCRIPTION OF THE DRAWINGS

FIGS. 1A and 1B, combined as shown in FIG. 1, are block diagrams showing a construction of a stepping motor controlling apparatus according to an embodiment of the present invention;

DESCRIPTION OF THE PREFERRED EMBODIMENTS

The present invention will now be fully explained in connection with embodiments thereof with reference to the accompanying drawings.

Figure 1B:
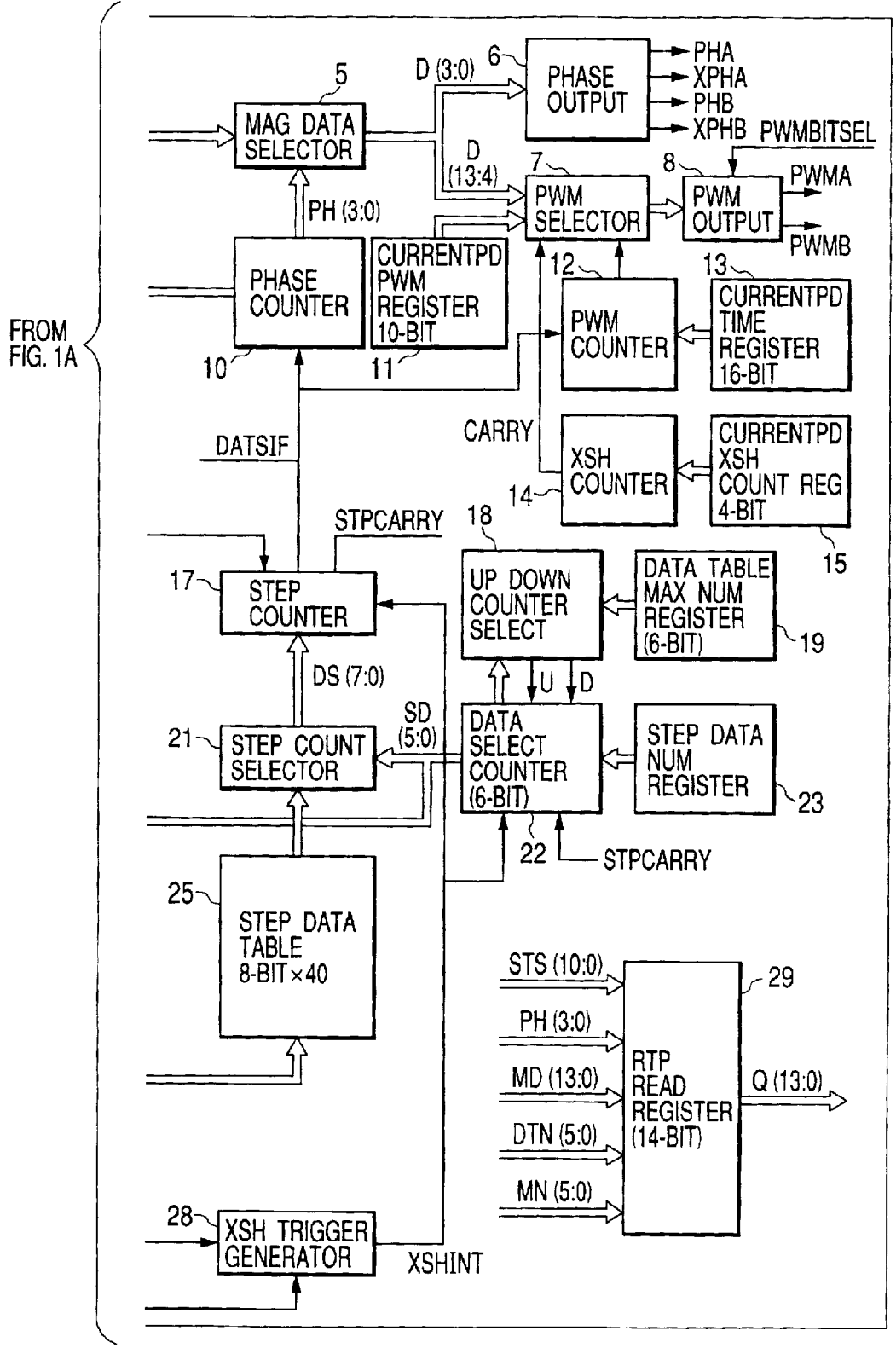

FIGS. 1A and 1B, combined as shown in FIG. 1, are block diagrams showing an example of a construction of a stepping motor controlling apparatus according to an embodiment of the present invention. In FIGS. 1A and 1B, the stepping motor controlling apparatus includes a CPU 1 for controlling the entire apparatus (including reading control), an image processing block 2 for effecting various processing operations such as resolving power (or resolution) conversion and magnification change of an image, a motor control unit 3 for effecting data setting and control for motor driving, a ROM 31 for storing a program for effecting a basic operation of motor control, a reader unit 33 for inputting the image as data through a CCD (charge coupled device) or a CS (contact sensor), a RAM 32 for storing image data read by the reader unit 33, and a divider 30 for producing a divided clock of a system clock. The reader unit 33 are so arranged as to read a color image and a monochromatic image in a conventional manner. Further, on the basis of an instruction from an operating portion (not shown), color reading or monochromatic reading can be instructed as a reading method. Further, regarding a resolving power for reading image, a plurality of resolving powers can be instructed. As mentioned above, the stepping motor controlling apparatus according to the present invention forms a part of an image reading apparatus.

The motor control unit 3 is constituted by four blocks. A first block is a block for controlling an exciting phase and an exciting current, which block is constituted by a 14-bit exciting (or magnetizing) pattern register 4 for storing an exciting pattern and PWM data (4:0) (here, (4:0) represents a 5-bit signal) of A-phase and B-phase, an exciting data selector 5 for selecting the exciting pattern by phase number data PH (3:0) (here, (3:0) represents a 4-bit signal) of an exciting phase counter 10 for counting the exciting phase, and an exciting phase number register 9 for storing the phase number data PH (3:0).

A second block is a block for effecting PWM (pulse width modulation) output for controlling phase output and exciting current, which block is constituted by an exciting phase output portion 6 for outputting an exciting phase pattern D (3:0) selected by the exciting data selector 5, a current power-down PWM register 11 (3:0) which is set when power-down of the exciting current is effected, a PWM selector 7 for selecting an exciting current pattern (13:4) selected by the exciting data selector 5 and a current power-down PWM value, a PWM output portion 8 for outputting the selected PWM value, a current power-down timer register 13 for storing time data until the current is powered-down, a PWM counter 12 for counting a current power-down timer and for outputting a selection signal to the PWM selector 7, a current power-down XSH trigger register 15 for storing XSH (line trigger) number until the current is powered-down, and an XSH counter 14 for counting current power-down XSH trigger number and for outputting a selection signal to the PWM selector 7.

A third block is a block for effecting phase shift on the basis of timer data for advancing the phase and step data, which block is constituted by an exciting timer table 24 for storing exciting timer data, a step data table 25 for storing data (step data) regarding the number of steps of the timer, a data selection counter 22 for counting a table number of an acceleration/deceleration data table comprised of the timer data and the step data and for outputting a selection signal, an exciting timer selector 20 for selecting the exciting timer data corresponding to the table number on the basis of the selection signal outputted by the data selection counter 22, a step count selector 21 for selecting the step data corresponding to the table number selected on the basis of the selection signal, an exciting timer 16 for counting the exciting timer data selected by the exciting timer selector 20, a step counter 17 for counting the step data selected by the step count selector 21, a data table maximum number setting register 19 for storing a maximum table number of the acceleration/deceleration data table, an up-down count selecting portion 18 for outputting a control signal for effecting count-up or count-down of the acceleration/deceleration data table, and an acceleration/deceleration data table step number register 23 for storing the number of steps in the step-up or the step-down of the acceleration/deceleration data table.

An XSHDIV signal is an interruption output from the image processing block 2 to the CPU and is an N-line trigger set to N times of one-line of an image. Here, while an example that N is set to 16 will be explained, the present invention is not limited to such an example, N may be set to 32 or 8. Further, when N=1, the N-line trigger to the CPU is generated with one line unit. This case is suitable when the image is read with highly fineness at a low speed. A fourth block is a block for producing an internal trigger XSH interval from the N-line trigger (XSHDIV signal), which block is constituted by an XSH interval (referred to as "XSHINT" hereinafter) delay setting register 26 for storing a delay time of the internal trigger, an XSHINT delay counter 27 for counting an XSHINT delay value, and an SXH trigger generator 28 for producing the internal trigger having a period equal to or shorter than the N-line trigger. The internal trigger (XSHINT) has a period same as that of one-line of the image, i.e., one-line image data outputted from the reading unit 33.

A read register 29 of the motor control unit 3 serves to output motor setting condition output (STS) representing a setting condition of the motor control unit by address setting, phase number data (PH) representing a phase condition of the motor, data table number data (DTN) representing the acceleration/deceleration data table number, and exciting pattern condition output (MD) representing a current exciting pattern condition, as read data.

Figure 2:
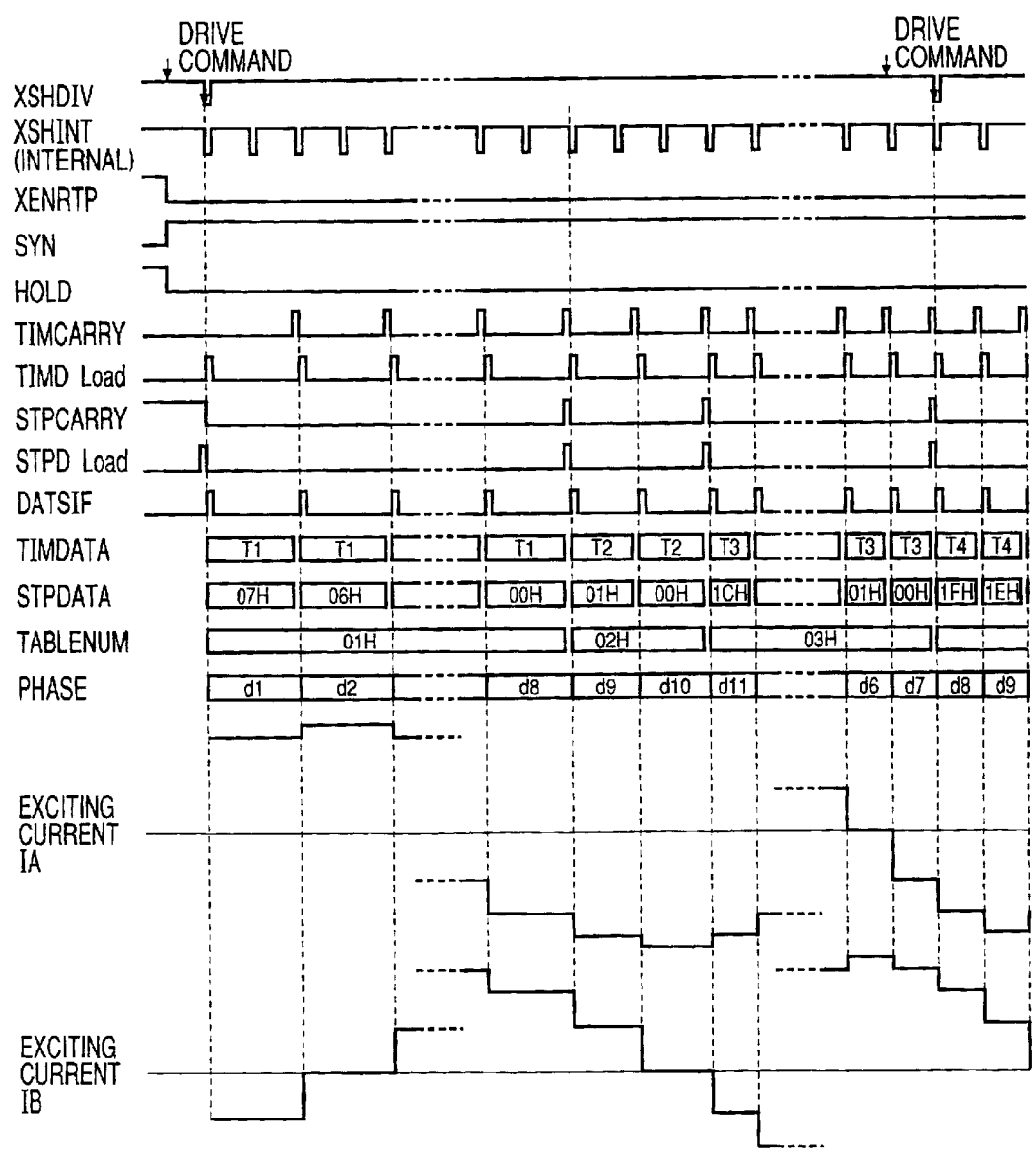
FIG. 2 is a timing chart showing an example of the stepping motor controlling apparatus according to the embodiment of the present invention.

FIG. 2 is a view showing an embodiment of a timing chart representing a synchronous mode of the stepping motor controlling apparatus shown in FIGS. 1A and 1B.

The XSHDIV signal is an interruption output from the image processing block 2 to the CPU and represents an N-line trigger set to N times of one-line of the image. Here, since the N-line triggers effects only one interruption to the CPU during the reading of 16-line image. The CPU can perform other processing operation efficiently.

On the basis of the XSHDIV signal, the CPU 1 outputs drive command, stop command or motor reverse command to the motor control unit.

The internal trigger (XSHINT signal) is produced to be synchronized with the interruption signal inputted to the motor control unit 3. In the timing chart according to the illustrated embodiment, the period of the N-line trigger is set to 16 times of the internal trigger (XSHINT signal). Further, internal trigger delay shown in FIG. 2 is set to 0 (zero; none).

Here, while an example that the period of the N-line trigger (XSHDIV) is set to 16 times of the period of the internal trigger (XSHINT) will be explained, the present invention is not limited to such an example, but the former may be set to 32 times or 8 times of the latter. Further, when N=1, the N-line trigger to the CPU is generated with one line unit. This case is suitable when the image is read with highly fineness at a low speed. An XENRTP signal is an enable signal for an internal circuit of the motor control unit 3 and becomes active when XENRTP is Low. An SYN signal is a signal for setting synchronism/non-synchronism with the N-line trigger (XSHDIV signal), and, when the SYN signal is High, a synchronous mode is selected. When the SYN signal is Low, a non-synchronous mode is selected.

The synchronous mode is a mode in which timings of the image processing block 2 and the motor driving are synchronized and the motor control unit 3 can be controlled by the CPU 1. In this mode, the motor control unit 3 effects the motor control until at least next N-line trigger is reached without giving a burden to the CPU 1. Further, since a position of the image being actually read and a motor driving amount are adjusted in the synchronous mode, the synchronous mode is suitable for a stopping operation on the reading during the reading and a re-starting operation of the reading. Accordingly, the synchronous mode is suitable when the image having great memory usage amount such as a color image or an image having high resolving power is read. Since the stop of the reading during the reading and the reading re-start can be effected, the image having high resolving power can be read at a high speed by using a memory having small memory capacity.

Here, the CPU 1 is set so that, when the reading of the color image or the image having high resolving power is designated via the operating portion (not shown), the synchronous mode is selected.

On the other hand, the non-synchronous mode is a mode in which the internal trigger is produced when the XENRTP signal outputted from the CPU 1 and other operation conditions are satisfied, and the motor control is effected up to end of one page regardless of the N-line trigger by driving motor.

Namely, in the non-synchronous mode, the motor control unit 3 can perform the start of the motor driving and timing adjustment with respect to the image processing block 2 on the basis of the XENRTP signal, a HOLD signal (described later), etc. and perform the motor control without acting the load on the CPU 1 until the reading of the image in one-page is finished. Thus, the non-synchronous mode is suitable when the image having small memory usage amount such as a monochromatic made which does not require the stop of the motor during the reading and the re-start.

The HOLD signal is a signal which is outputted from the CPU 1 and gives the exciting current to the motor without effecting the phase shift and holds the motor to a hold condition. When the HOLD signal is High, a hold mode is attained. On the other hand, when the HOLD signal becomes Low, the motor is changed to a drive permitting condition. In the non-synchronous mode, when the HOLD signal becomes Low, the motor driving is started.

A TIMD Load represents a timing for loading timer data (T1 in TIMDATA) to the exciting timer 16 via the exciting timer table 24. An STPD Load represents a timing for loading step data (STPDATA; for example, 07H) to the step counter 17 via the step data table 25. When the counting is effected up to data T1 by a timer counter in the exciting timer 16, TIMCARRY (carry of timer counter) is outputted. When the TIMCARRY is outputted, the step data is counted by the step counter 17. In the example shown in FIG. 2, the down-count is shown, but up-count also is effected in the similar manner.

When the step data becomes 00H (in down-count) or for example set data 07H (in up-count), the exciting timer 16 outputs STPCARRY (carry of step counter). When the STPCRRY is outputted, the step counter 17 advances the count of the acceleration/deceleration data table comprised of the timer data and the step data in accordance with the set table step number. If the STPCARRY (step carry) is not outputted, after the TIMCARRY (timer carry) is outputted, the timer data is loaded to the exciting timer 16 again, and the count is started.

A DATSIF signal which is a signal for advancing phase data (PHASE) is outputted when the TIMCARRY is outputted, thereby charging the excitating current and the phase. In the illustrated timing chart, an embodiment of exciting currents IA, IB of W1-2-phase excitation (micro step driving) is shown.

A TABLENUM (table number) of an acceleration/deceleration data table comprised of the exciting timer data and the step data is counted-up (or counted-down) by the data selection counter 22 on the basis of the STPCARRY (step carry) signal. By this operation, the switching of the acceleration/deceleration data table is effected.

As mentioned above, by using the non-synchronous mode, since the motor driving amount is not synchronous with the reading position of the image, when the image for one-page is read without stopping, the burden of the CPU can be reduced greatly. However, if the image for one-page cannot be stored in the memory and thus the motor is stopped on the way, the reading position is not aligned with the stop position of the motor. In this case, since the image must be read again at the beginning, it is very inconvenient. In such a case, by using the synchronous mode, the stop of reading of the image and the re-start can easily be performed without reading the image at the beginning. Further, since the stop of reading of the image and the re-start can be effected on the way of the reading, the capacity of the image memory can be reduced.

Now, the processing regarding the reading stop and reading re-start using the synchronous mode will be explained.

Here, in the non-synchronous mode, since the other signals are the same as those shown in FIG. 2 except that the non-synchronous mode is operated regardless of the N-line trigger (XSHDIV signal), explanation thereof will be omitted.

Figure 3:
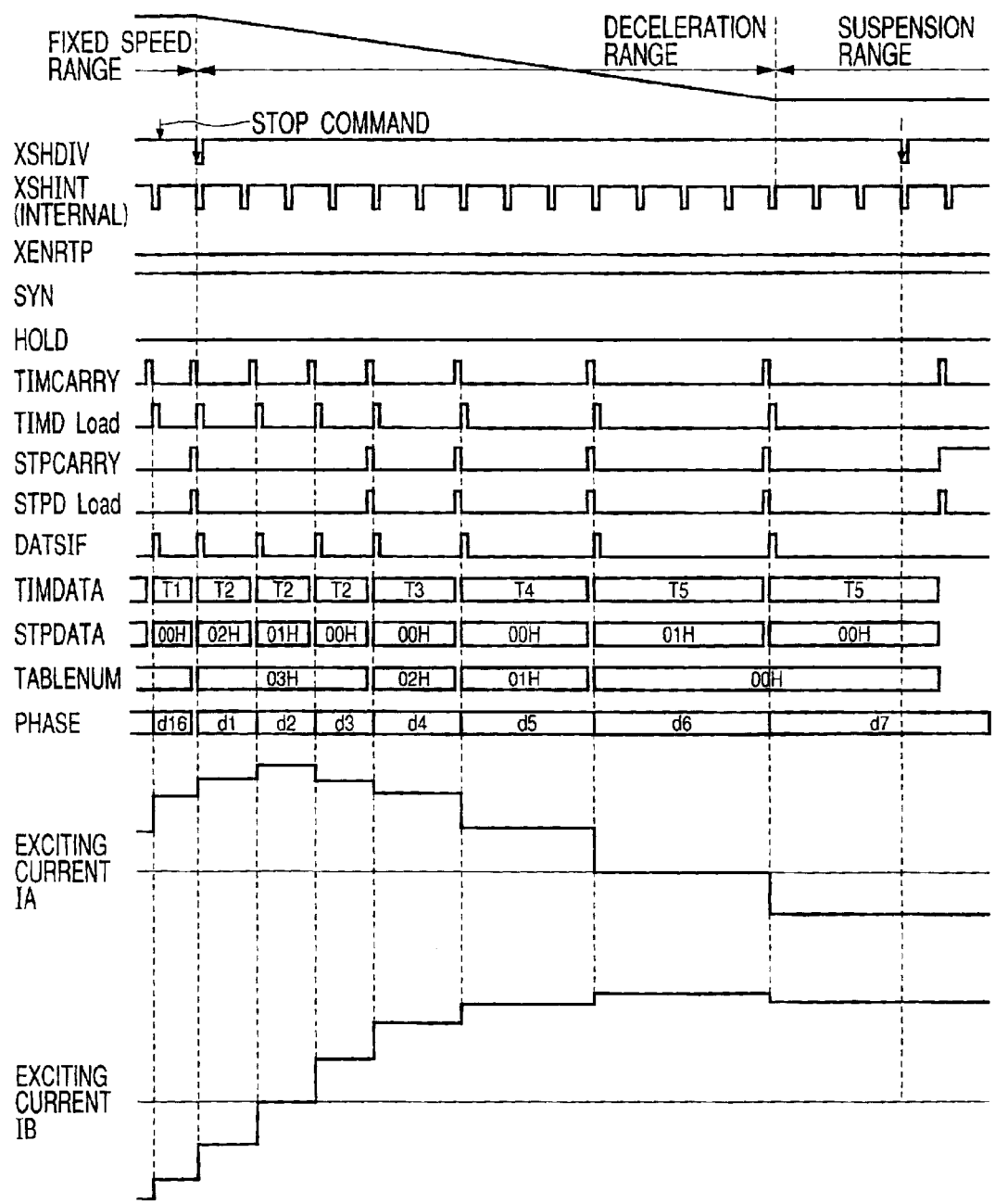
FIG. 3 is a timing chart showing an example of the stepping motor controlling apparatus according to the embodiment of the present invention in a reading stop condition.
Figure 4:
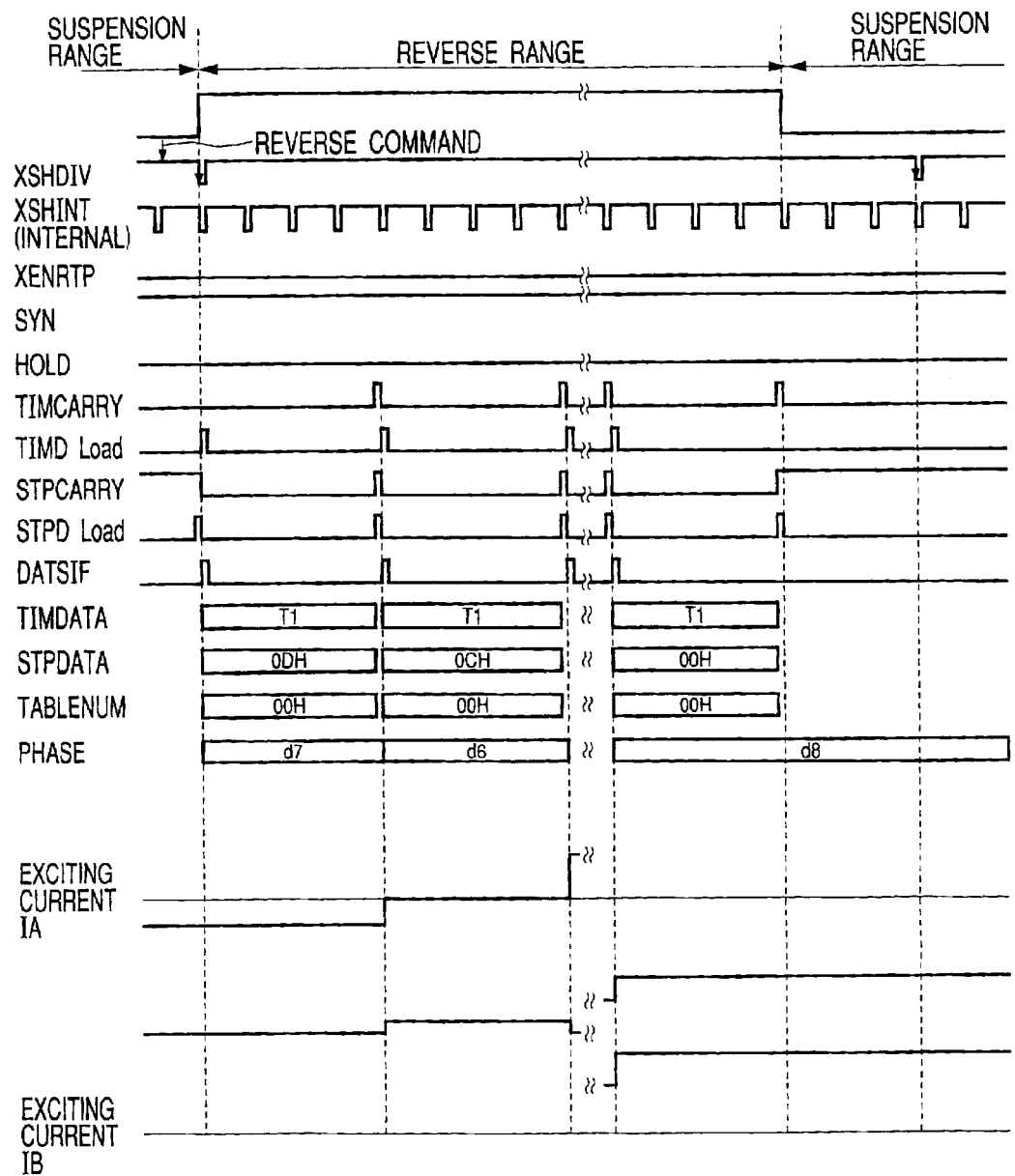
FIG. 4 is a timing chart showing an example of position adjustment in reading re-start in the stepping motor controlling apparatus according to the embodiment of the present invention.

FIG. 3 is a view showing an embodiment of a timing chart regarding the reading stop of the stepping motor controlling apparatus shown in FIGS. 1A and 1B. In the timing chart according to the illustrated embodiment, an example that the period of the N-line trigger (XSHDIV signal) is set to 16 times of the period of the internal trigger (XSHINT signal) is shown.

First of all, when the CPU 1 judges that the vacant capacity of the RAM 32 as the memory for storing the image data is below a predetermined capacity in accordance with the program stored in the ROM 31, the CPU 1 outputs STOP command for stopping the motor to the stepping motor control unit 3 between the N-line trigger (XSHDIV signal). Then, in synchronous with the N-line trigger (XSHDIV signal), the deceleration control of the motor is performed in accordance with the deceleration table previously written in the motor control unit, thereby stopping the motor. If the CPU 1 judges that the vacant capacity is reserved in the memory, although the reading is re-started, regarding image line data within the deceleration range, the following processing can be considered. If the reading is re-started after the motor is re-accelerated by reverse switch-back, the image data in the deceleration range is abandoned. Alternatively, if the reading is re-started at a low speed requiring no acceleration or if the reading in re-acceleration is performed, the image data is reserved. Here, while an example that the motor is stopped within the period (16 lines) of the N-line triggers (XSHDIV signal) was shown, the same is true so long as the memory corresponding to the deceleration lines can be maintained even if the period of the XSHDIV signal is exceeded.

Here, while an example that the deceleration/stop of the motor is effected when the vacant capacity of the memory is reduced below the predetermined capacity was explained, a case where the deceleration/stop of the motor is effected when the vacant capacity of the memory is increased above a predetermined capacity is also included within the scope of the present invention.

Figure 5:
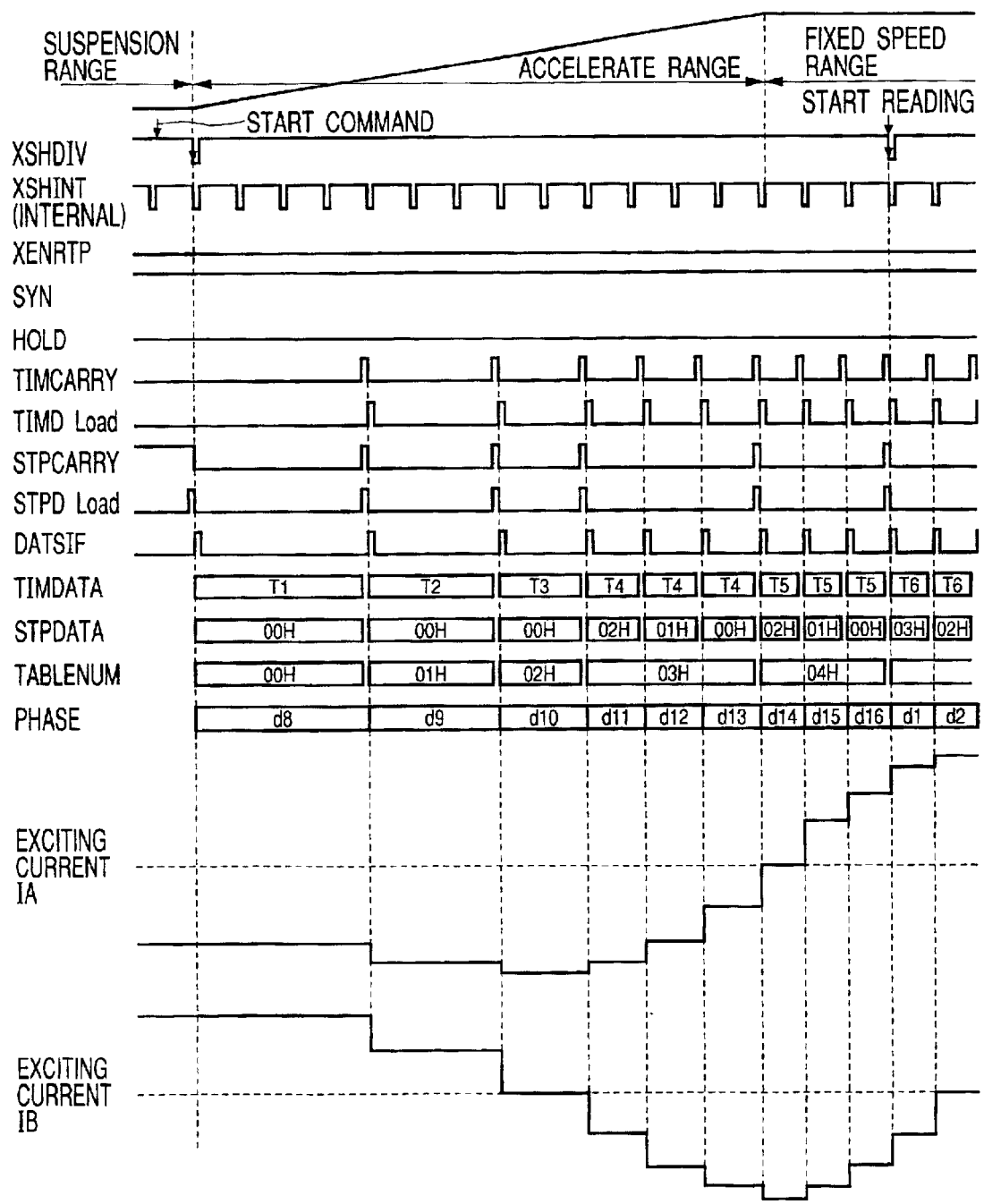
FIG. 5 is a timing chart showing an example of the stepping motor controlling apparatus according to the embodiment of the present invention in a reading re-accelerating condition.

FIG. 5 is a view showing an embodiment of a timing chart regarding positional adjustment in the reading re-start in the stepping motor controlling apparatus shown in FIG. 1.

The CPU 1 outputs reverse command (ROLIMOD=1) for rotating the motor reversely to the stepping motor control unit 3 between the N-line triggers (XSHDIV signal). Then, in synchronous with the N-line trigger (XSHDIV signal), the reverse control is performed in accordance with the reverse table previously written in the motor control unit. As a result, the motor performs reverse switch-back by an amount corresponding to the phase data required for acceleration/deceleration to coincide with the phase data upon initiation of deceleration.

FIG. 5 is a view showing an embodiment of a timing chart in the reading re-acceleration in the stepping motor controlling apparatus shown in FIG. 1.

The CPU 1 outputs START comman for starting the motor to the stepping motor control unit 3 between the N-line triggers (XSHDIV signal). Then, in synchronous with the N-line trigger (XSHDIV signal), the motor control unit 3 performs the re-acceleration control in accordance with the acceleration previously written in the motor control unit. In this case, the motor control unit 3 controls the motor so that the reading can be re-started up to the deceleration starting position.

In this way, the image can be read without distortion while synchronizing with the reading timing of N lines even when the stop control, reverse switch-back control and/or re-acceleration control is performed on the way of the reading. Further, even in case of high speed reading, since the frequent interruption (such as interruption for each line unit) is not executed, the burden of the CPU 1 can be reduced considerably.

Here, while an example that the motor is stopped by outputting the STOP command when the vacant capacity of the memory is reduced below the predetermined value was explained, the present invention is not limited to such an example, but, for example, the following method may be used.

That is to say, the motor driving command is outputted to the motor control unit in synchronous with the N-line trigger (XSHDIV signal) until the vacant capacity of the memory is reduced below the predetermined value, and, if the vacant capacity of the memory is reduced below the predetermined value, the motor driving command is not outputted in synchronous with the N-line trigger (XSHDIV signal). By doing so, the effect similar to that obtained when the STP command is outputted can be achieved, and, thus, such a method is also included in the scope of the present invention.

Next, control sequence of the acceleration/deceleration data table regarding the phase shift in the stepping motor controlling apparatus according to the illustrated embodiment will be explained with reference to a flow chart shown in FIG. 6.

First of all, initial setting of the motor control unit is effected (step S3001). The initial setting includes trigger synchronous/non-synchronous mode setting, rotational direction setting, acceleration/deceleration data table step-up/step-down setting, output mode setting, motor control unit enable setting and the like. Then, the step data is loaded to the stepping counter 17 (step S3002). Then, it is judged whether the initially set mode is the synchronous mode (color mode)(SYN=1) (step S3003). If it is the synchronous mode (color mode), whether the N-line trigger (XSHDIV signal) is inputted or not (step S3004) is judged. If XSHDIV=0, synchronism with the XSHINT signal as the internal trigger (step S3005) is effected. In the step S3004, if XSHDIV≠0, the sequence goes to a step S3006. Then, it is judged whether the internal trigger is inputted (XSHINT=L) or not (step S3006). If inputted, the DATSIF as the phase shift signal is changed to High, thereby loading the exciting timer data (step S3007). Incidentally, in the step S3003, if the initially set mode is the non-synchronous mode (SYN=0) or monochromatic mode, the sequence goes to the step S3007. In the step S3006, if the internal trigger is not inputted, i.e., if XSHINT=H, an internal trigger waiting condition is continued.

Then, in the step S3005, the timer data is loaded and the count-up or the count-down of the exciting timer is carried out (step S3008). If the timer data setting value is reached, the timer carry is outputted (TIMCARRY=H)(step S3009).

Then, the count-up (in case of up counter) or the count-down (in case of down counter) of the step data is performed (step S3010). When the value of the step counter 17 becomes the sep data setting value (in case of up counter) or 00H (in case of down counter), it is judged whether the step carry is outputted (STPCARRY=H) or not (step S3011). If the step carry is outputted, it is judged whether the setting of up/down mode of the acceleration/deceleration data table is an up-count mode (UDMOD=0) or not (step S3012). If the up-count mode, the acceleration/deceleration data table is counted-up (step S3013). Then, it is judged whether the acceleration/deceleration data table counter is greater than the set data table number (DataTableCOUNT>MAXNUM) or not (step S3015). If greater than the set acceleration/deceleration data table number, the set table number (MAXNUM) is inputted to the acceleration/deceleration data table number SD (3:0) (step S3017). In the step S3015, if the acceleration/deceleration data table counter is smaller than the set data table number, the counted-up count value (NUM) is inputted to the acceleration/deceleration data table number SD (3:0) (step S3018).

In the step judgement (step S3012), if the setting of up/down of the acceleration/deceleration data table is a down count mode (UDMOD=1), the acceleration/deceleration data table is counted-down (step S3014). Then, it is judged whether the acceleration/deceleration data table counter is smaller than 1 (DataTableCount≦1) or not (step S3016). If smaller than 1, data 01H is inputted to the acceleration/deceleration data table number SD (3:0) (step S3019). In the step S3016, the acceleration/deceleration data table counter is not smaller than 1, the counted-down count value (NUM) is inputted to the acceleration/deceleration data table number SD (3:0) (step S3020).

Here, the reason why the judgement reference is set to 1 (or less) in the step S3016, is that, when the number of steps of the acceleration/deceleration data table is set to 2 steps for example, the count value may become 0 (zero). In the steps S3017 to S3020, after the acceleration/deceleration data table number SD was set, the sequence is returned to the step S3002, and the above-mentioned operations are repeated.

Figure 6:
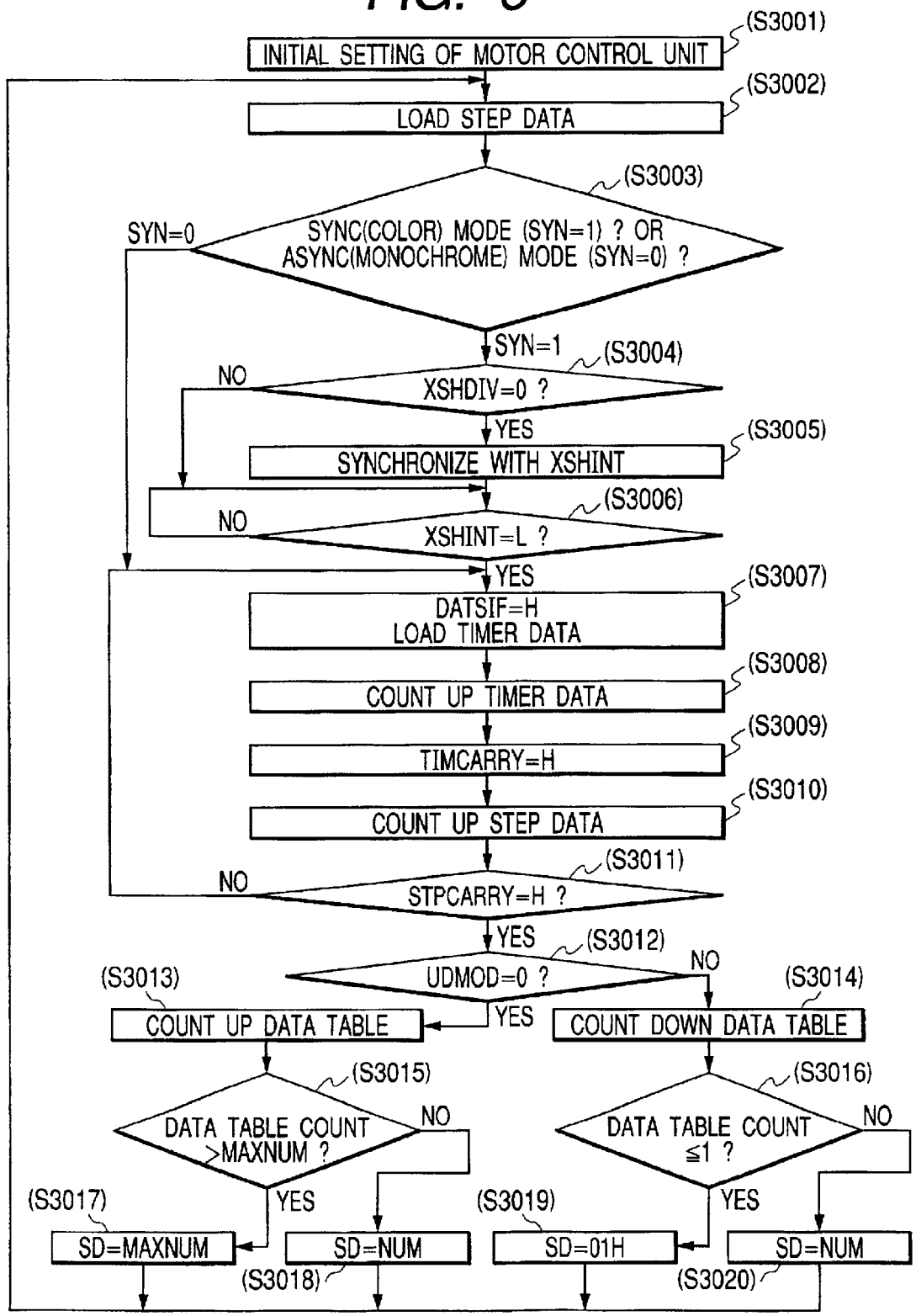
FIG. 6 is a flow chart showing an example of processing sequence of an acceleration/deceleration table associated with phase shift of the stepping motor controlling apparatus according to the embodiment of the present invention.

As shown in FIG. 6, the acceleration/deceleration data table number is fixed to the ultimately set acceleration/deceleration data table number or 01H. This means that, after the acceleration or deceleration of the motor is completed, fixed speed rotation is continued. In the example shown in FIG. 6, in order to stop the motor, for example, the exciting current may be stopped by an enable signal of the motor control unit, for example.

Next, control sequence of PWM output of the stepping motor controlling apparatus according to the illustrated embodiment will be explained with reference to a flow chart shown in FIG. 7.

First of all, when the start of reading of the image is instructed, initial setting of the motor control unit 3 is effected (step 4001). The initial setting regarding the PWM output portion 8 includes setting of PWM data (5 bits) for generating desired exciting current included in the exciting pattern data, setting of PWM data (5 bits) in current power-down, setting of current power-down timer until switched to this PWM data, setting of XSHINT (N-line trigger) number until the current is powered-down, and setting of the number of bits of PWM.

Here, regarding the PWM data in the current power-down, although the exciting current is switched from a normal condition to a lower condition within the same phase in order to prevent noise generated when the motor is driven at a low speed, such PWM data corresponds to a lower current value. Further, the current power-down timer is a timer used until the exciting current is switched from normal exciting current to lower exciting current within the same phase after the exciting current is supplied. Further, the XSHINT (N-line trigger) number until the current is powered-down serves to prevent that the time duration for maintaining the higher exciting current due to false running of the CPU 1 is not continued so long. Further, the number of bits of the PWM is data representing how bits among the PWM data having 5-bit width are effective as the PWM data. When the color image or the image having high resolving power is read with highly fineness at a high speed (this is instructed from the operating portion (not shown)), great bit number (for example, 5 bits) is set. As a result, since a current wave form having correct sine wave can be realized, smooth motor driving is permitted. If it is not required that the image is read with highly fineness at the high speed, small bit number (for example, 4 bits) is set. In this case, less smooth motor driving is obtained in comparison with the great bit number.

Figure 7:
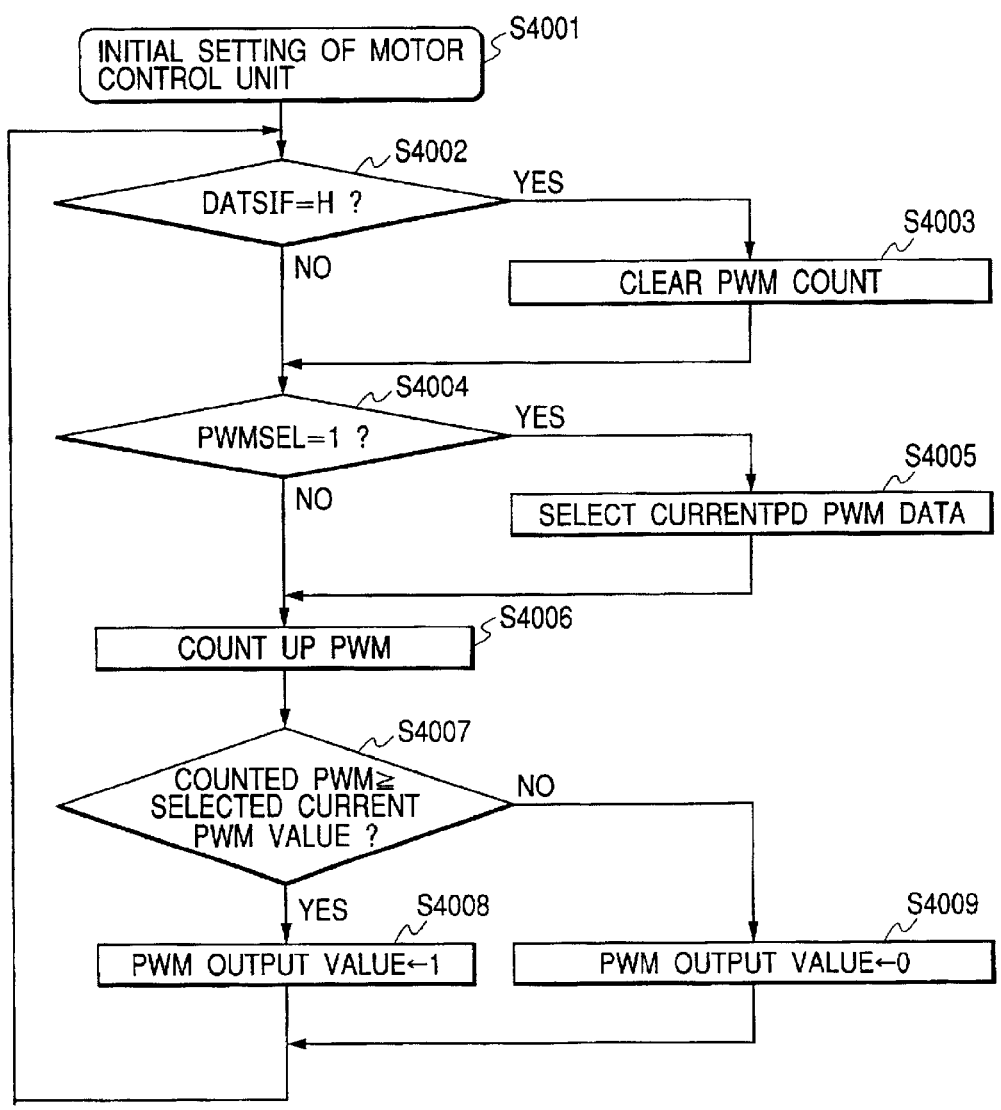
FIG. 7 is a flow chart showing an example of control sequence of PWM output of the stepping motor controlling apparatus according to the embodiment of the present invention.

Again, with reference to the flowchart of FIG. 7, it is judged whether the phase data shift signal DATSIF is High or not (step S4002). If DATSIF=H, the PWM counter in the PWM output portion 8 is cleared (step S4003).

In the step S4002, if the phase data shift signal DATSIF= L, it is judged whether the PWMSEL signal for switching to the PWM data in the current power-down is 1 or not, i.e., whether the power-down should be effected or not (step S4004). If PWMSEL=1 (to be powered-down), the PWM data in the current power-down (stored in the register 11) is selected by the PWM selector 7 (step S4005). In the step S4004, if PWMSEL=0, then, the PWM counter (setting of the number of bits of PWM) of the PWM output portion 8 is counted-up (step S4006). Then, it is judged whether the count value reaches the PWM setting value (PWM data value) (step S4007). If the count value reaches the PWM setting value, the PWM output value is set to 1 (step S4008); whereas, if smaller than the PWM setting value, the PWM output value is set to 0 (step S4009). When the PWM counter counts up to the number of bits of the PWM (counts up to 32 in case of 5 bits), all PWM output values are determined. While PWM output value=1 is being outputted, an ON signal is transmitted to a power supply (not shown) in the rear stage; whereas, while PWM output value=0 is being outputted, an OFF signal is transmitted to the power supply (not shown) in the rear stage. The power supply (not shown) in the rear stage serves to output exciting current having a desired current value in dependence upon a length of ON/OFF signal. When all PWM output values are determined in the step S4008 or S4009, the sequence is returned to the step S4002, and the similar operations are repeated.

Figure 8:
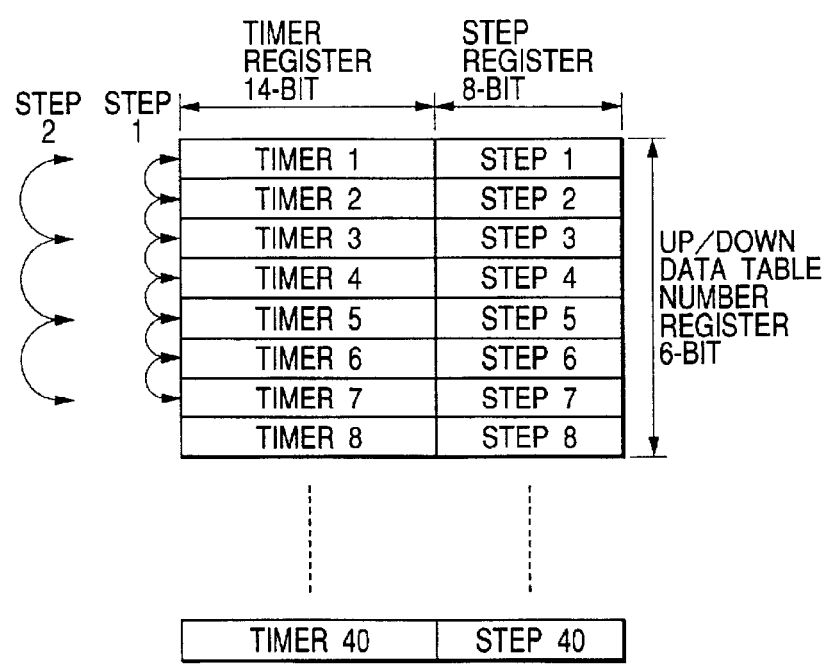
FIG. 8 is a view showing an example of register setting of an acceleration/deceleration table comprised of timer data and a stepping motor of the stepping motor controlling apparatus according to the embodiment of the present invention.

FIG. 8 is a view showing an example of register setting of the acceleration/deceleration data table comprised of the timer data and the step data in the stepping motor controlling apparatus shown in FIG. 1.

In the example shown in FIG. 8, a case where the timer setting register can be set up to 14 bits×40 and the number of steps setting register can be set up to 8 bits×40. The acceleration/deceleration data table number register requires 6 bits since the data table number is 40. In accordance with the set acceleration/deceleration data table number, for example up/down the number of steps of the acceleration/deceleration data table set within 7 tables (for example, the number of steps=2), table 1 (TIMER1, STEP1) is shifted to table 3 (TIMER3, STEP3) and then to table 5 (TIMER5, STEP5).

As mentioned above, according to the present invention, the burden of the software processing of the CPU can be reduced, and the motor control corresponding to one-line interruption in the conventional high speed reading can be realized. Further, even when the motor control is changed during the reading, since the motor driving amount and the reading position of the image are synchronized, the reading can be re-started so that the image can be read without distortion.

Further, according to the present invention, the burden of the software processing of the CPU can be reduced, and the motor control corresponding to one-line interruption in the conventional high speed reading can be realized.

Further, according to the present invention, the acceleration/deceleration of the motor can be realized within the synchronous signal having N-times period while synchronizing with the line trigger, and the burden of the software processing of the CPU can be reduced and the motor control capable of effecting acceleration/deceleration and corresponding to one-line interruption in the conventional high speed reading can be realized.

According to the present invention, by preparing the plural motor control modes having different burdens to the CPU, the optimum motor control can be selected.

According to the present invention, also in the synchronous mode, the burden of the software processing of the CPU can be reduced and the motor control corresponding to one-line interruption in the conventional high speed reading can be realized. Further, even when the motor control is changed during the reading, since the motor driving amount and the reading position of the image are synchronized, the reading can be re-started so that the image can be read without distortion.

According to the present invention, the optimum motor control can be selected in accordance with the image data amount. Regarding the image having great image data amount, the motor control can be changed during the reading so that the control regarding the stop of reading in the lack of memory capacity and reading re-start can be achieved.

Regarding the image having small image data amount, the motor control capable of greatly reducing the burden of the software processing of the CPU can be selected.

According to the present invention, the optimum motor control can be selected in dependence upon whether the image is color or monochromatic. Regarding the color image, the motor control can be changed during the reading so that the control regarding the stop of reading in the lack of memory capacity and reading re-start can be achieved. Regarding an image including a smaller monochromatic image, the motor control capable of greatly reducing the burden of the software processing of the CPU can be selected.

According to the present invention, the burden of the software processing of the CPU can be reduced, and the motor control corresponding to one-line interruption in the conventional high speed reading can be realized. Further, during the reading, even if the motor is stopped due to lack of the memory capacity, since the motor driving amount and the reading position of the image are synchronized, the reading can be re-started so that the image can be read without distortion. Further, during the reading, even if the motor is stopped due to lack of the memory capacity, since the reading without distortion can be re-started, the reading can be realized with highly fineness at a high speed while reducing the memory capacity.

According to the present invention, even if the motor is stopped due to lack of the memory capacity, since the motor driving amount and the reading position of the image are synchronized, the reading can be re-started so that the image can be read without distortion.

According to the present invention, even when the reading is re-started, the reading re-start control for realizing the motor control which reduces the burden of the CPU and corresponds to one-line interruption in the conventional high speed reading can be achieved without distortion of the image.

According to the present invention, by preparing the plural motor control modes having different burdens to the CPU, the optimum motor control can be selected.

According to the present invention, the optimum motor control can be selected in accordance with the image data amount. Regarding the image having great image data amount, the motor control can be changed during the reading so that the burden of the CPU is reduced and the control regarding the stop of reading in the lack of memory capacity and reading re-start can be achieved. Also regarding the image having small image data amount, the motor control capable of greatly reducing the burden of the software processing of the CPU can be selected.

According to the present invention, the optimum motor control can be selected in dependence upon whether the image is color or monochromatic. Regarding the color image, the motor control can be changed during the reading so that the control regarding the stop of reading in the lack of memory capacity and reading re-start can be achieved. Regarding an image including a smaller monochromatic image, the motor control capable of greatly reducing the burden of the software processing of the CPU can be selected.

According to the present invention, the optimum exciting current suitable for the image can be obtained, thereby permitting the stable motor driving.

Further, according to the present invention, since the step-up or the step-down of the acceleration/deceleration data table is effected on the basis of the step-up number or the step-down number held in the step-up or step-down number storing means 23, the re-writing of the registers under no load can be achieved, and the acceleration/deceleration control exceeding the acceleration/deceleration table number can be realized by combining up/down of the acceleration/deceleration data table register, thereby achieving reduction of the burden of the software processing and the stable operation with respect to such control. Further, when the motor control unit is constituted by ASIC and the like, reduction of the burden of the software processing and reduction of gate scale can be compatible, thereby subdividing the acceleration range.

Further, according to the present invention, in the stepping motor controlling apparatus, since the motor control unit 3 has the fourth storing means 19 for holding the table number of the acceleration/deceleration tables and the step-up or the step-down of the acceleration/deceleration table is stopped on the basis of the table number held by the fourth storing means 19, the data number of the acceleration/deceleration data to be written in the program area can be reduced.

What is claimed is:

1. An apparatus for controlling a stepping motor, comprising:

synchronous signal receiving means for receiving a synchronous signal generated in a period corresponding to N (natural Number) times a period of one-line of an image;

line trigger producing means for producing N (natural number) line triggers synchronously with reception of the synchronous signal;

instruction receiving means for receiving a motor control instruction from a CPU synchronously with the reception of the synchronous signal, and motor control means for effecting the control of said stepping motor until at least the occurrence of a next synchronous signal, on the basis of the line triggers produced by said line trigger producing means in response to the motor control instruction received by said instruction receiving means, wherein said motor control means includes first memory means for holding timer data for advancing a phase of said stepping motor and second memory means for holding the number of steps of the timer data, and said stepping motor is controlled on the basis of the held timer data and the held number of steps, wherein said motor control means is synchronized with the line triggers produced by said producing means and controls acceleration/deceleration of said stepping motor by switching acceleration/deceleration data tables comprised of the timer data and the number of steps, and wherein said instruction receiving means receives the motor control instruction from the CPU synchronously with the reception of the synchronous signal even after the control of acceleration/deceleration is ended.

2. A stepping motor controlling apparatus according to claim 1, wherein said motor control unit includes PWM output data storing means for holding PWM output data having a predetermined number of bits for determining an exciting current for said stepping motor, and PWM output means for outputting the PWM data stored in said PWM output data storing means synchronously with a phase of said stepping motor, and wherein said stepping motor is controlled by setting the number of bits of the PWM data outputted from said PWM output means.

3. A stepping motor controlling apparatus according to claim 1, wherein said motor control unit includes step-up or step-down number storing means for holding a step-up number or a step-down number of said acceleration/deceleration table, and step-up or step-down of said acceleration/deceleration table is effected on the basis of the step-up number or the step-down number held by said step-up or step-down number storing means.

4. A stepping motor controlling apparatus according to claim 3, wherein said motor control unit includes table number storing means for holding a table number of acceleration/deceleration tables, and step-up or step-down of said acceleration/deceleration table is stopped on the basis of the table number held by said table number storing means.

5. A stepping motor control method to be conducted using a stepping motor control apparatus, comprising:

a synchronous signal receiving step of receiving a synchronous signal generated in a period corresponding to N (natural number) times a period of one-line of an image;

a line trigger producing step of producing N (natural number) line triggers synchronously with reception of the synchronous signal;

an instruction receiving step of receiving a motor control instruction from a CPU synchronously with the reception of the synchronous signal; and a motor control step of effecting the control of said motor until at least the occurrence of a next synchronous signal, on the basis of the line triggers produced in said trigger producing step, in response to the motor control instruction received in said instruction receiving step, wherein said stepping motor control apparatus includes first memory means for holding timer data for advancing a phase of said stepping motor and second memory means for holding the number of steps of the timer data, and said motor control step controls said stepping motor on the basis of the held timer data and the held number of steps, wherein said motor control step is synchronized with the line triggers produced in said producing step and controls acceleration/deceleration of said stepping motor by switching acceleration/deceleration data tables comprised of the timer data and the number of steps, within one-period of the synchronous signal, and wherein said instruction receiving step receives the motor control instruction from the CPU synchronously with the reception of the synchronous signal even after the control of acceleration/deceleration is ended.

6. A stepping motor control method according to claim 5, wherein said motor control step includes a PWM output data storing step for holding PWM output data having a predetermined the number of bits for determining an exciting current for said stepping motor, and a PWM output step for outputting the PWM data stored in said PWM output data storing step synchronously with a phase of said stepping motor, and wherein said stepping motor is controlled by setting the number of bits of the PWM data outputted in said PWM output step.

7. A stepping motor control method according to claim 5, wherein said motor control step includes a step-up or step-down number storing step for holding a step-up number or a step-down number of said acceleration/deceleration table, and step-up or step-down of said acceleration/deceleration table is effected on the basis of the step-up number or the step-down number held in said step-up or step-down number storing step.

8. A stepping motor controlling method according to claim 7, wherein said motor control step includes a table number storing step for holding a table number of acceleration/deceleration tables, and step-up or step-down of said acceleration/deceleration table is stopped on the basis of the table number held in said table number storing step.

* * * * *

UNITED STATES PATENT AND TRADEMARK OFFICE
CERTIFICATE OF CORRECTION

PATENT NO.         : 6,992,459 B2
APPLICATION NO. : 09/988439
DATED                : January 31, 2006
INVENTOR(S)       : Akitoshi Kikuchi It is certified that error appears in the above-identified patent and that said Letters Patent is hereby corrected as shown below:

ON TITLE PAGE AT (57) ABSTRACT

Line 4, "in" should be deleted;
Line 5, "synchronous" should read --synchronously--; and
Line 6, "table" should read --tables--.

COLUMN 1

Line 8, "apparatus" should read --an apparatus--; and
Line 33, "the tables" should read --tables--.

COLUMN 2

Line 19, "permit of" should read --permit--;
Line 23, "apparatus" should read --an apparatus--;
Line 29, "much image data amount" should read --a high amount of image data--;
Line 32, "apparatus" should read --an apparatus--;
Line 37, "in synchronous" should read --synchronously--;
Line 39, "unit in" should read --unit--;
Line 42, "next" should read --the next--;
Line 59, "apparatus" should read --an apparatus--; and
Line 67, "in synchronous" should read --synchronously--.

COLUMN 3

Line 19, "next" should read --the next--;
Line 38, "case" should read --the case--;
Line 39, "great" should read --a high--;
Line 40, "small" should read --a low--;
Line 40, "case" should read --the case--;
Line 44, "case" should read --the case--;
Line 45, "case" should read --the case--;
Line 48, "apparatus" should read --an apparatus--;
Line 50, "line unit" should read --a line unit--;
Line 55, "in synchronous" should read --synchronously--;
Line 58, "unit it" should read --unit--;
Line 59, "synchronous" should read --synchronously--; and
Line 63, "in synchronous" should read --synchronously--.

UNITED STATES PATENT AND TRADEMARK OFFICE
CERTIFICATE OF CORRECTION

PATENT NO. : 6,992,459 B2
APPLICATION NO. : 09/988439
DATED : January 31, 2006
INVENTOR(S) : Akitoshi Kikuchi It is certified that error appears in the above-identified patent and that said Letters Patent is hereby corrected as shown below:

COLUMN 4

Line 11, "reading in" should read --reading--;
Line 12, "synchronous" should read --synchronously--;
Line 21, "in synchronous" should read --synchronously--;
Line 32, "great" should read --a high--;
Line 32, "case" should read --the case--;
Line 34, "small" should read --a low--;
Line 34, "case" should read --the case--;
Line 37, "case" should read --the case--;
Line 38, "case" should read --the case--;
Line 40, "apparatus" should read --an apparatus--;
Line 45, "triggers in" should read --triggers--;
Line 46, "synchronous with" should read --synchronously with--;
Line 50, "in synchronous" should read --synchronously--; and
Line 52, "next" should read --the next--.

COLUMN 5

Line 1, "apparatus" should read --an apparatus--;
Line 10, "motor in" should read --motor--;
Line 11, "synchronous with" should read --synchronously with--;
Line 16, "in synchronous" should read --synchronously--;
Line 33, "next" should read --the next--;
Line 52, "case" should read --the case--;
Line 53, "great" should read --a high--;
Line 54, "small" should read --a low--;
Line 54, "case" should read --the case--;
Line 58, "case" should read --the case--;
Line 59, "case" should read --the case--;
Line 65, "predetermined the" should read --predetermined--.

COLUMN 6

Line 1, "means in" should read --means--
Line 8, "predetermined the" should read --predetermined--;
Line 11, "in synchronous" should read --synchronously--; and
Line 26, "tables," should read --tables, and--.

UNITED STATES PATENT AND TRADEMARK OFFICE
CERTIFICATE OF CORRECTION

PATENT NO. : 6,992,459 B2
APPLICATION NO. : 09/988439
DATED : January 31, 2006
INVENTOR(S) : Akitoshi Kikuchi It is certified that error appears in the above-identified patent and that said Letters Patent is hereby corrected as shown below:

COLUMN 7

Line 15, "are so" should read --is so--
Line 21, "image," should read --images,--;
Line 52, "number" should read --numbers--; and
Line 54, "number" should read --numbers--.

COLUMN 8

Line 21, "highly fineness" should read --high definition--;
Line 47, "triggers" should read --trigger--;
Line 48, "16-line image. The" should read --a 16-line image, the--;
Line 66, "highly" should read --high--; and
Line 67, "fineness" should read --definition--.

COLUMN 9

Line 18, "great" should read --high--;
Line 23, "small" should read --low--;
Line 32, "end" should read --the end--;
Line 41, "having" should read --has a--;
Line 41, "small" should read --low--; and
Line 42, "made" should read --image--.

COLUMN 10

Line 9, "excitating" should read --exciting--; and
Line 55, "in synchronous" should read --synchronously--.

COLUMN 11

Line 19, "in synchronous" should read --synchronously--;
Line 29, "comman" should read --command--;
Line 31, "in synchronous" should read --synchronously--;
Line 53, "in synchronous" should read --synchronously--;
Line 57, "outputted in" should read --outputted--; and
Line 58, "synchronous" should read --synchronously--.

UNITED STATES PATENT AND TRADEMARK OFFICE
CERTIFICATE OF CORRECTION

PATENT NO. : 6,992,459 B2
APPLICATION NO. : 09/988439
DATED : January 31, 2006
INVENTOR(S) : Akitoshi Kikuchi It is certified that error appears in the above-identified patent and that said Letters Patent is hereby corrected as shown below:

COLUMN 12

Line 30, "sep data" should read --step data--; and
    Line 56, "S3016," should read --S3016, if--.

COLUMN 13

Line 39, "highly fineness" should read --high definition--;
    Line 40, "great" should read --a high--;
    Line 44, "highly fineness" should read --high definition--;
    Line 45, "small" should read --a low--; and
    Line 47, "great" should read --high--.

COLUMN 14

Line 17, "In the" should read --The--;
    Line 17, "Fig. 8," should read --Fig. 8 shows--;
    Line 23, "up/down the" should read --the up/down--; and
    Line 64, "great" should read --high--.

COLUMN 15

Line 25, "highly fineness" should read --high definition--.

UNITED STATES PATENT AND TRADEMARK OFFICE
CERTIFICATE OF CORRECTION

PATENT NO. : 6,992,459 B2
APPLICATION NO. : 09/988439
DATED : January 31, 2006
INVENTOR(S) : Akitoshi Kikuchi It is certified that error appears in the above-identified patent and that said Letters Patent is hereby corrected as shown below:

COLUMN 18

Line 15, "the number" should read --number--.

Signed and Sealed this

Fifteenth Day of August, 2006

JON W. DUDAS
*Director of the United States Patent and Trademark Office*